United States Patent [19]
Wilson et al.

[11] 3,861,982
[45] Jan. 21, 1975

[54] APPARATUS FOR PRODUCING SHEET MOLDING COMPOSITE

[75] Inventors: Edward L. Wilson, Newark; John J. McCluskey, Granville, both of Ohio; Ronald Z. Bell, Huntsville, Ala.; Richard T. Linak, Jackson, Tenn.; Gordon P. Armstrong, Newark, Ohio

[73] Assignee: Owens-Corning Fiberglas Corporation, Toledo, Ohio

[22] Filed: Jan. 6, 1972

[21] Appl. No.: 215,770

[52] U.S. Cl................ 156/356, 156/276, 156/510, 156/551, 156/555, 156/578, 425/115, 425/141
[51] Int. Cl............................................ B32b 31/06
[58] Field of Search.................. 156/253, 299–301, 156/62.4, 276, 351, 356, 555, 547–551, 179, 87; 425/4 C, 110, 115, 817 C, 141

[56] References Cited
UNITED STATES PATENTS

| | | | |
|---|---|---|---|
| 3,037,900 | 6/1962 | Hings et al.................. | 156/547 X |
| 3,233,576 | 2/1966 | Voelker...................... | 156/351 X |
| 3,443,003 | 5/1969 | Anderson..................... | 425/115 X |
| 3,615,979 | 10/1971 | Davis, Sr. et al............ | 156/179 |

Primary Examiner—William A. Powell
Assistant Examiner—M. G. Wityshyn
Attorney, Agent, or Firm—Carl G. Staelin; John W. Overman; Allen D. Gutchess, Jr.

[57] ABSTRACT

A method and apparatus for producing a sheet molding composite are provided. The sheet molding composite consists of two outer sheets of plastic material between which is sandwiched a moldable material or compound containing fiber-reinforced resin. The resin-containing material is maintained in a deformable, flexible state until it is placed in a mold and subjected to heat, at which time it is cured in the shape of the final molded product. The molding composite is made by depositing a layer of a pre-blended resin-containing material on the upper surface of one of the sheets of plastic material and by then depositing a layer of randomly disposed glass fibers onto this first layer. A second layer of pre-blended resin-containing material from the same source is also deposited on an upper surface of a second of the plastic sheets. The latter sheet is then turned over and moved into parallel relationship with respect to the first sheet and with the second layer of resin-containing material moved into contact with the reinforcing fibers on the first layer of resin-containing material. The composite is then kneaded to thoroughly mix the fibers and resin-containing material and at least one of the plastic sheets and material therebelow is punctured by needles to remove air through the resulting passages. The resin can then be partially cured and the partially cured composite wound on a reel where it can be stored until molded. To obtain uniformity throughout the composite, the layers of resin-containing material deposited on the sheets must be uniform. Heretofore, this has required very careful blending of the materials for each of the sheets and very careful mixing thereof by kneading, when in the composite. In accordance with the invention, the layers of resin-containing material for the two outer sheets are supplied from the same source so that identical compositions are achieved for those layers. The blending and mixing steps are thus simplified or shortened by this arrangement with uniformity still being assured.

9 Claims, 7 Drawing Figures

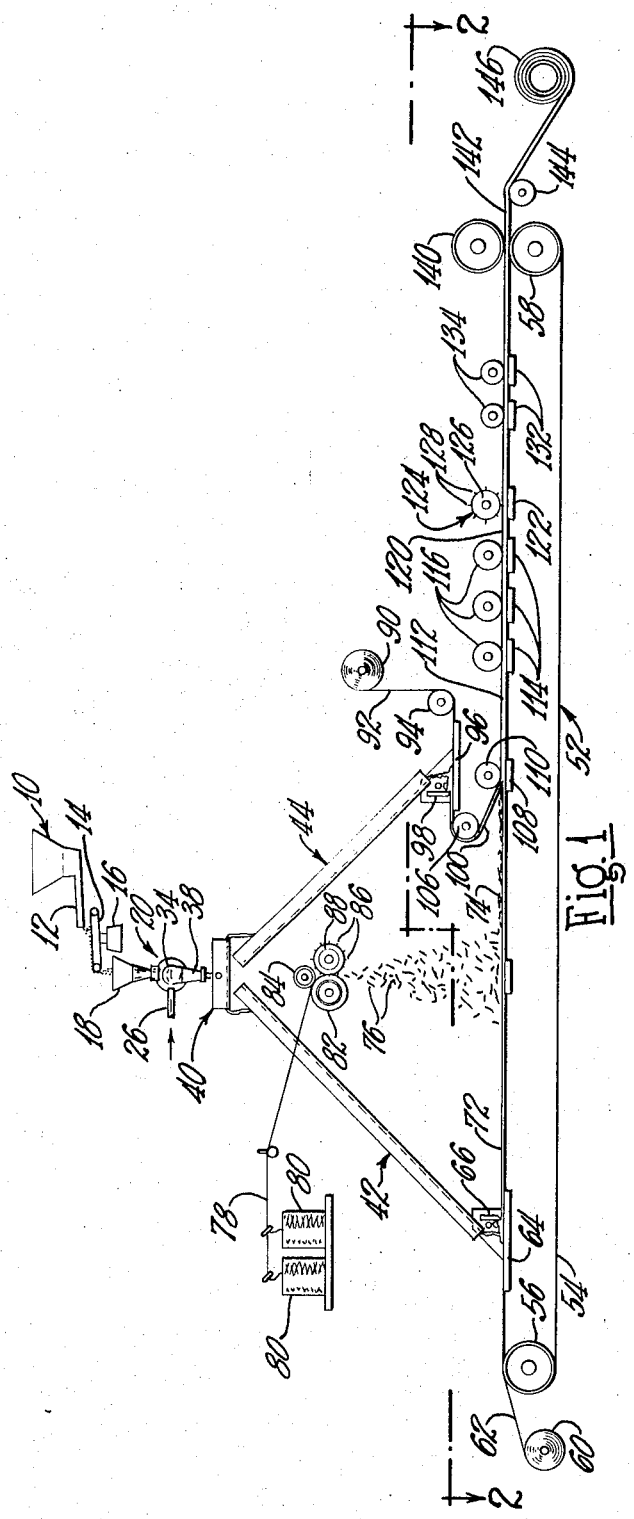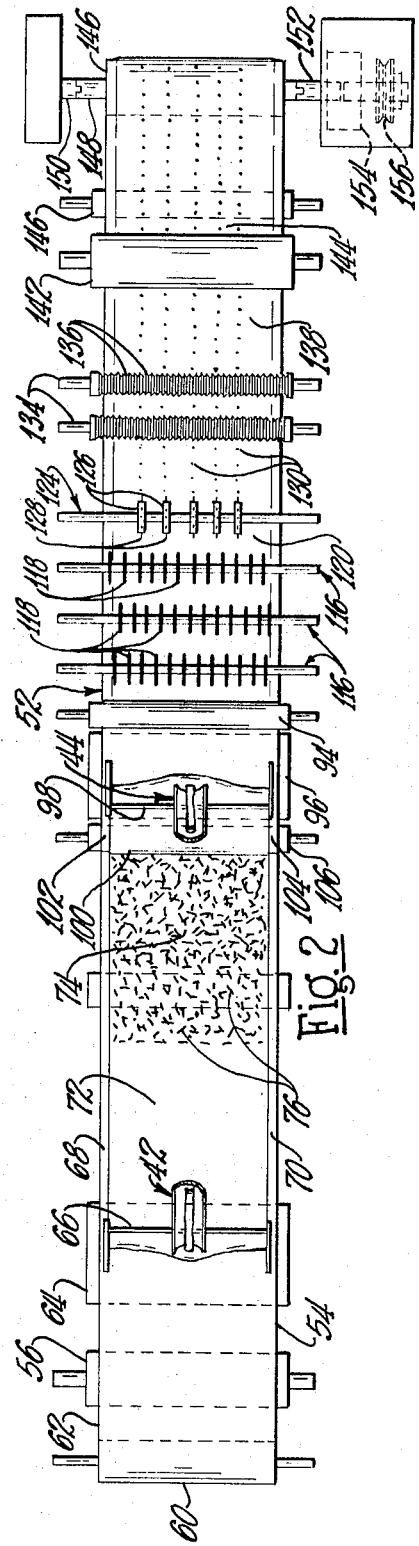

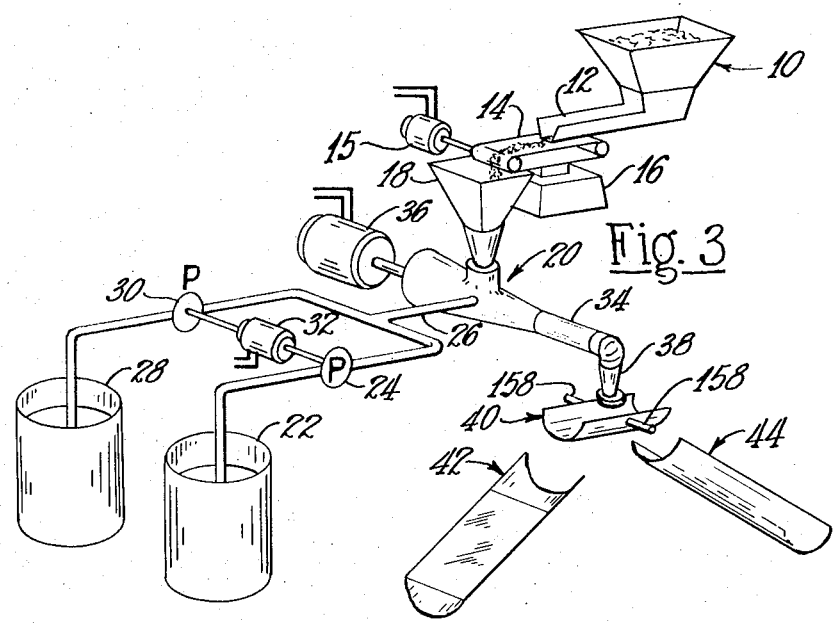
Fig. 3
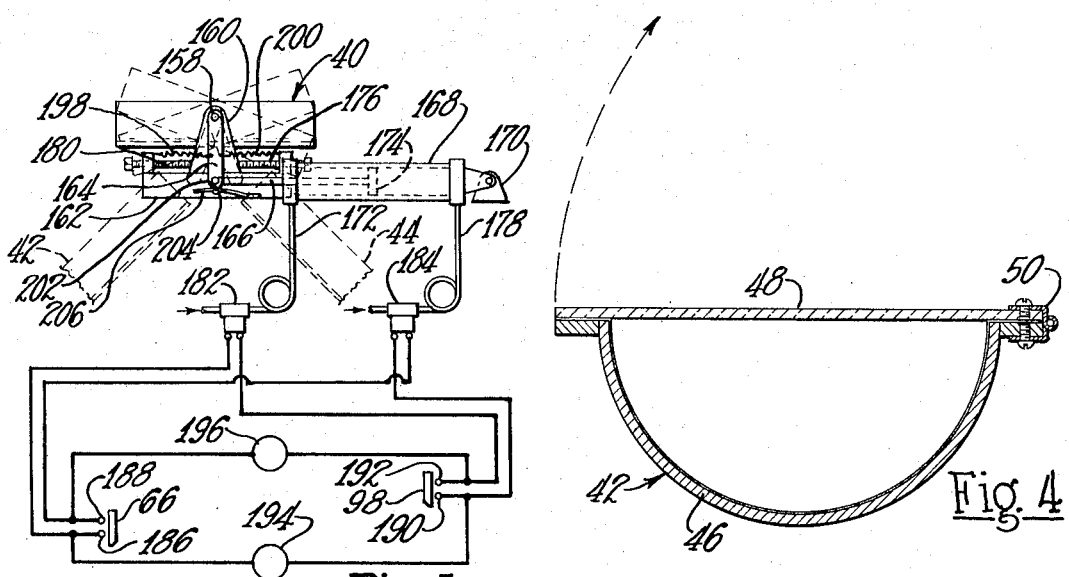
Fig. 4
Fig. 5
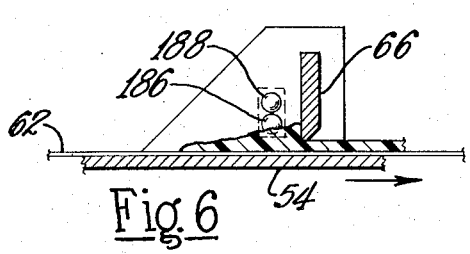
Fig. 6
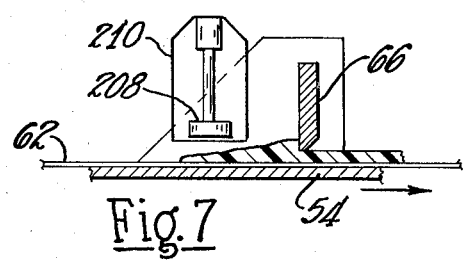
Fig. 7

APPARATUS FOR PRODUCING SHEET MOLDING COMPOSITE

This invention relates to a method and apparatus for producing a sheet molding composite.

Various processes have heretofore been employed for producing molded fiber-reinforced plastic products. In one common technique, surfaces of a mold are coated with a resin, and glass-reinforcing fibers in the form of a mat are applied thereto, with additional resin then applied over the deposited mat. These steps are repeated until a desired thickness is built up on the mold surfaces. The resin is then cured and the resulting finished article removed from the mold.

In another technique, resin is sprayed upon surfaces of a mold by means of a spray gun which also simultaneously directs chopped glass fibers toward the surfaces along with the resin spray, the two mixing as they proceed on converging paths toward the mold surfaces and impinge thereon. The spraying operation is continued until the desired thickness is achieved, with the resin then cured and the composite removed from the mold.

In a third and substantially different technique, matched metal dies are employed. A body of mixed resin and glass fibers is placed in the mold cavity and the matched dies closed under substantial pressure to compress the resin and fiber body into the shape of the mold. The resin and fiber body also can be forced into the mold cavity by a ram. Rather than a single body of resin and fibers, pellets thereof can be injected into the die cavity.

All of these techniques have had one or more deficiencies. Thus, a substantial amount of labor is required in some instances to produce the article. In other instances, expensive equipment is required which, at best, is only suited for high production rates.

The present invention provides an improved molding composite in a sheet or flat form. Specifically, the composite includes a pair of flexible, outer plastic sheets with a moldable material or compound therebetween. To provide a desired molding charge, the flat composites can be cut to approximate sizes or shapes for a given mold cavity and, after the outer sheets are removed, the compound can be used in multiple layers, three or four being common for an average mold cavity. In this manner, the molding compound can be distributed in the die or mold cavity in an approximation such that very high pressures are not required to form the completed molded product. By employing several layers of the molding compound, in place of one thicker body of resin and fibers, greater uniformity of the composite material throughout the cavity can also be achieved. The composites are also easy to handle and can be adapted to automatic mechanical handling techniques.

The sheet molding composite according to the invention utilizes a single, common source of resin-containing material for application to both outer plastic sheets forming the surfaces of the composite. The resin-containing material includes a liquid resin, a catalyst, and pre-blended solids or fillers along with a mold-release material, and a thickening agent. The combined and mixed material is fed to a common supply point from which it is then divided into two streams. One stream is directed to an upper surface of a first one of the outer sheets of plastic and the other stream is directed to the upper surface of the second one of the outer sheets of plastic, with the material uniformly spread on both sheets. Reinforcing fibers are then randomly, but uniformly, distributed over the resin-containing material on the first sheet. Subsequently, the second sheet is directed into parallel relationship with respect to the first sheet with the resin-containing material on the second sheet moved into contact with the fibers on the first sheet.

The resulting composite thus has identical resin-containing layers on both of the sheets and it is only necessary to mix the middle layer of fibers with the two resin-containing material layers to achieve a uniform molding compound throughout the space between the outer two plastic sheets. This mixing can be achieved by passing the composite between sets of rollers which knead the material and enable the fibers to be wet-out thoroughly with respect to the two resin-containing layers. The upper sheet, or both if desired, can then be punctured to release air from the material within, with further kneading or compression applied to force out the air.

Heat then can be applied to partially cure the composite, after which the composite can be rolled onto a reel for easy storage until ready for use. By controlling the formulation of the resin-containing material, the composites can be stored anywhere from a few days to several months or longer without hardening, thereby retaining the soft, pliable, non-tacky condition desired for the molding process.

It is, therefore, a principal object of the invention to provide an improved sheet molding composite for use as a charge in producing a molded product.

Another object of the invention is to provide apparatus for making sheet molding composites which utilizes a single source of resin-containing material to be applied to each of two outer sheets or films of the composite.

Still another object of the invention is to provide an improved method for making a sheet molding composite using a single source of resin-containing material for two layers of moldable material or compound in the composite.

Yet another object of the invention is to provide a sheet molding composite which is more uniform in composition throughout.

Other objects and advantages of the invention will be apparent from the following detailed description of a preferred embodiment thereof, reference being made to the accompanying drawings, in which:

FIG. 1 is a somewhat schematic side view in elevation of apparatus according to the invention for forming sheet molding composites;

FIG. 2 is a somewhat schematic view of the apparatus of FIG. 1, taken along the line 2—2 of FIG. 1;

FIG. 3 is a somewhat schematic view in perspective of apparatus for producing resin-containing material for the molding compound and for distributing the material to two spaced portions of the apparatus of FIGS. 1 and 2 from a single supply;

FIG. 4 is a view in transverse cross section taken through a distributing trough of the apparatus of FIG. 3;

FIG. 5 is a slightly enlarged side view in elevation showing a distributor of the apparatus of FIG. 3 with means for changing the positions of the distributor, as shown in dotted lines, to control the proportions of resin-containing, moldable material to the two spaced portions of the apparatus of FIGS. 1 and 2;

FIG. 6 is a fragmentary view in longitudinal cross section taken through a portion of the apparatus of FIGS. 1 and 2 and showing means for spreading moldable material on a sheet and means for sensing the amount of the material on the sheet, to control the positioning means of FIG. 5; and FIG. 7 is a fragmentary view in cross section similar to FIG. 6 but showing modified sensing apparatus.

The sheet molding composite of the invention includes two outer sheets preferably of a polyethylene plastic material. The resin-containing, moldable material or compound applied as layers to both of the plastic sheets comes from a single supply source in accordance with the invention to assure uniformity of both layers. The moldable material can include a liquid resin which can be either of a one- or two-component type, either pre-blended or separate, depending upon the application for which the molding compound is to be used. A catalyst, usually liquid, is employed, along with blended solids serving as fillers which can be, by way of example, calcium carbonate or iron oxide, along with pigments for color where desired. An internal mold release agent, such as zinc stearate, is also used in the resin-containing moldable material along with a thickening agent, such as magnesium oxide or hydroxide, or calcium oxide or hydroxide. The reinforcing glass fibers used in the material can have a wide range of diameters and be supplied in amounts ranging from 10% to 40% by weight of the molding compound, depending on the final product to be molded. Preferably, the fibers are initially coated with a coupling agent to facilitate wetting-out of the reinforcing fibers and the resin-containing material.

More specific materials, especially resins and coatings for the glass fibers, are disclosed in a copending application of C. J. Davis et al., Ser. No. 741,677, filed July 1, 1968.

Referring to FIGS. 1 and 3, the solids employed in the resin-containing material are metered or measured in predetermined amounts and ratios, mixed, and supplied to a hopper 10. From here, the solids are moved through a trough 12 by an auger (not shown) onto a conveyor 14 driven by a motor 15. The solids moving along the conveyor 14 are continuously weighed by a scale 16 and fed to a supply hopper 18 of a mixer 20. Liquid resin can be fed from a suitable container 22 at a predetermined rate by a metering pump 24 to the mixer 20 through a supply line 26. Liquid catalyst can be supplied from a suitable container 28 by a metering pump 30 to the mixer 20 through the supply line 26. The metering pumps 24 and 30 are driven by a common drive unit or motor 32 to assure a constant ratio of feed by the pumps. The solids and liquids supplied to the mixer 20 are mixed and forced through a high shear section 34 driven by a heavy-duty motor 36. The thoroughly mixed moldable material then is fed to a supply spout 38 constituting a single source of supply of the resin-containing, moldable material for all of the apparatus or line for producing the sheet molding composite.

From the supply spout 38, the moldable material is fed centrally to a distributor or pivoted trough 40 which controls distribution of the moldable material to the two spaced portions of the line where the material is applied as layers to the plastic sheets. Control means for operating the trough will be discussed subsequently.

The moldable material from the distributor 40 is fed to two inclined, delivering chutes or troughs 42 and 44. These chutes are preferably covered to prevent the escape of vapors to the atmosphere. Accordingly, as shown in FIG. 4, the chute 42 includes a lower U-shaped trough member 46 and a cover plate 48. The cover plate 48 is transparent so as to enable an operator to ascertain the conditions in the chute and is pivotally attached to one longitudinal edge of the trough member 46 by a hinge 50. This enables the cover plate to be readily lifted for cleaning purposes. To facilitate cleaning, the trough member also can be provided with a disposable plastic liner. Hence, the form of the chutes 42 and 44, as shown in FIG. 4, enables the advantages of a closed system to be obtained and yet enables the chutes to be readily inspected and cleaned.

A belt conveyor indicated at 52 (FIGS. 1 and 2) extends below the chutes 42 and 44. The conveyor includes a longitudinally extending belt 54 which extends around an idler pulley 56 and a driven pulley 58.

A first supply roll 60 of a sheet material 62, specifically polyethylene film, is located near the idler pulley 56, with the sheet 62 being moved along the upper run of the belt 54 and under the chute 42. Here the sheet 62, while supported on a platform 64, receives the moldable material from the chute 42. The material is of such viscosity that it spreads on the sheet sufficiently even though emanating from only one location, namely the end of the chute 42 or 44. However, for wider sheets or more viscous material, the chute can be oscillated back and forth across the sheet or other suitable spreading means can be employed. The material is then leveled over most of the sheet 62 by distributing means in the form of a doctor blade 66. Edge portions 68 and 70 (FIG. 2) of the sheet 62 preferably are left free of a layer 72 of the moldable material formed on the sheet 62. The layer at this time can be in the order of one-sixteenth to one-eighth inch thick.

As the belt 54 and the sheet 62 with the layer 72 of moldable material thereon move along the line, a layer 74 of reinforcing glass fibers 76 is deposited on top of the layer 72. To provide the fibers 76, glass strands 78, which are coated with a suitable coupling agent, are pulled from packages 80 between rolls 82 and 84 where they are chopped into short, preferably varying lengths by cutter bars 86 radially extending from a chopper roll 88. The cutter bars 86 engage a rubber surface on the roll 82 to break the strands 78 into the fibers 76. The layer of the fibers 74 deposited on the layer 72 of molding material can be in the order of one-fourth to one-half inch thick.

A second roll 90 provides a second supply of sheet material 92, specifically polyethylene film. This sheet is led around a guide roll 94 and over a supporting platform 96 under the discharge end of the second chute 44. The material from this chute spreads onto the sheet 92 and is leveled by distributing means in the form of a doctor blade 98, forming a uniform layer 100 on the sheet 92, except for longitudinally-extending edge portions 102 and 104. This sheet and layer are led around a second guide roll 106 and downwardly into parallel relationship with the first sheet 62 and the layers 72 and 74 thereon. The layer 100 of moldable material is brought into contact with the layer 74 of the fibers 76 as the sheets 62 and 92 are pulled between a supporting plate 108 and a squeeze roll 110. A composite 112 thereby results, consisting of the sheet 62, the layer 72 of molding compound, the layer 74 of the fibers 76, the second layer of molding compound 100, and the second sheet 92, all in lamellar form. The composite 112 then passes between supporting plates 114 and kneading rolls 116 having a multiplicity of discs 118 thereon. These discs are staggered so as to thoroughly press together and mix the layers 72, 100, and 74, wetting out the fibers with the moldable material.

A resulting kneaded composite 120 then passes between a supporting plate 122 and a puncturing roll 124 having a plurality of discs 126 with radially-extending needles 128. The needles 128 pierce the upper sheet 92, forming holes 130 in a predetermined pattern. The needles also penetrate a substantial distance into the mixed fiber and moldable compound between the sheets and thereby form pasaages to enable the escape of air from the composite.

The composite then passes between supporting plates 132 and rollers 134 having spaced, radially-extending ridges 136 which are effective to further knead and mix the fibers and resin and also to force out any air from the composite.

A modified composite 138 then passes between the roll 58 and an additional pinch roll 140 which squeeze the composite 138 and tend to smooth the sheets 62 and 92 again, after being kneaded. The roll 140 can be heated, if desired, to partially cure the resin.

A resulting final composite 142 emerges from the rolls 58 and 140, passing over a supporting roll 144, and being wound on a storage reel 146. Prior to being wound on the reel, the uncoated edges of the sheets 62 and 92 can be folded over one another, if desired. The reel 146 has a shaft 148 removably mounted on end supports 150 and 152, the latter one being driven through a reduction drive 154 and a suitable pulley 156.

The resulting composite 142 on the reel 146 can then be placed in storage until required for molding. Depending on the composition, the composite 142 can be retained in a pliable state for anywhere from a few days to several months. The thickness of the composite, after squeezing and kneading, will be from one one-eighth to one-fourth inch.

With the single source of supply for the moldable material, it is only necessary to be sure that the fibers 76 and the moldable material are mixed. It is not necessary to be concerned with thorough mixing of the two layers 72 and 100 of the moldable material, since the single source assures their uniformity.

The relative distribution of the moldable material to the two portions of the line through the chutes 42 and 44 is controlled by the angle of the tiltable distributor 40. This can be controlled by an operator of the line or it can be accomplished automatically.

Means for changing the angle of the distributor 40 are shown in FIG. 5. Accordingly, shafts 158 of the distributor 40 are pivotally supported in ears 160 of a supporting frame 162. An arm 164 is affixed to the shaft 158 and extends downwardly to a point where it is pivotally connected to a piston rod 166 extending out of a fluid-operated cylinder 168. The blind end of the cylinder 168 is suitably pivotally supported by a rod supporting ear 170. When fluid is supplied to the rod end of the cylinder through a line 172, a piston 174 is moved toward the blind end of the cylinder until the arm 164 moves against an adjustable stop 176. The trough 40 then stays in that position until the fluid is shut off or until fluid is supplied through a line 178 to the opposite or blind end of the cylinder 168. In the latter instance, the piston 174 moves toward the rod end of the cylinder until the arm 164 moves against an adjustable stop 180. In the first position of the trough 40, more of the moldable compound is supplied to the chute 42 than to the chute 44, while in the second position, more is supplied to the chute 44 than the chute 42. The ratio of the amount supplied can be changed by adjusting the stop members 176 and 180.

Electrically-operated relay valves 182 and 184 control the supply of fluid to the supply lines 172 and 178. These in turn can be controlled by suitable sensing means located adjacent the doctor blades 66 and 98. As shown schematically in FIGS. 5 and 6, the sensing means can be in the form of lower and upper electric eyes 186 and 188 adjacent the doctor blade 66 for the valve 182. Similar electric eyes 190 and 192 can be located adjacent the doctor blade 98 for the valve 184. The elements 186-192, of course, represent the sending or receiving units of the electric eyes, the other elements of the electric eyes being located in corresponding positions on the opposite side of the belt 54.

When the level of the moldable compound drops below the lower electric eye 186, (FIG. 6) this electric eye opens the valve 182 to move the piston toward the blind end of the cylinder, tilting the distributor 40 in a manner such that more of the moldable compound is directed down the chute 42 toward the first sheet 62. When the level of the moldable compound adjacent the doctor blade 66 builds up to the point that the electric eye 186 is blocked, this closes the valve 182 and enables the distributor 40 to be moved back to the horizontal or neutral position. If the upper electric eye 188 is blocked, it opens the valve 184 and causes the distributor 40 to tilt toward the chute 44. Similarly, when the level of the moldable compound drops below the lower electric eye 190, the valve 184 is opened to move the piston toward the rod end of the cylinder and cause the distributor 40 to tilt toward the chute 44. When the level of the moldable compound adjacent the doctor blade 98 builds up to the point that the electric eye is blocked, the valve 184 is closed and the distributor 40 moves back to the neutral position. Finally, if the upper electric eye 192 is blocked, it opens the valve 182, causing the distributor 40 to tilt toward the chute 42 again.

If the level at both of the doctor blades 66 and 98 is sufficiently low that both of the lower electric eyes 186 and 190 are actuated, a suitable signal 194 can be produced to enable the operator to increase the supply of moldable material, or the line can be shut down. Similarly, if the material in front of the doctor blades 66 and 98 is sufficient that both of the upper electric eyes 188 and 192 are blocked, a signal 196 can be actuated to enable the operator to reduce the supply of moldable compound. The blocked electric eyes 188 and 192 can also shut down the drives 32 and 15 for the pumps 24 and 30 and the conveyor 14. In that instance a timer is also energized which sounds an alarm after a predetermined period. At that time if the system has not been restarted, the mixer 20 must be manually flushed.

When the valves 182 and 184 are closed, the distributor 40 is moved back to the neutral, horizontal position, by means of a pair of springs 198 and 200. The arm 164 also has a pointed end 202 which is received in a notch or recess 204 of a resilient member 206 when the arm is in the neutral position.

A modified sensing device or means is shown in FIG. 7. Here, a proximity sensor 208 is employed above the moldable material on the belt 54 adjacent the doctor blade 66, a similar sensing device being positioned adjacent the doctor blade 98. A shield 210 is necessary around the sensor to eliminate stray signals and to assure that only the level of the material on the belt 54 will have an effect on the reading of the sensor. The sensor can be be used to control valves for the cylinder 168 of FIG. 5. It can also be used to control a commercially-available, pneumatically-operated, rotary actuator through suitable solenoids.

In a more sophisticated system, when both sensing devices indicate a high level of moldable material on the belt, they could be employed to control D.C. motors serving as the drives for the resin pumps, solids conveyor and the conveyor belt. Through these motors, the speeds of the various feed rates could be regulated to control the overall level of the moldable material.

Various modifications of the above described embodiments of the invention will be apparent to those skilled in the art and it is to be understood that such modifications can be made without departing from the scope of the invention, if they are within the spirit and the tenor of the accompanying claims.

We claim:

1. Apparatus for producing resin-containing material in a flat form of predetermined thickness covered on major surfaces by flexible sheets, said apparatus comprising a conveyor belt, a first supply of a flexible sheet, means for guiding said sheet onto the belt, means for distributing a first layer of resin-containing material on said first sheet, a second supply of a flexible sheet, means for distributing a second layer of resin-containing material on said second sheet, means for guiding said second sheet into a position with said second layer toward said first layer, a source of said resin-containing material, means for delivering resin-containing material from said source toward said first distributing means, means for delivering resin-containing material from said source toward said second distributing means, said means for delivering resin-containing material from said source toward said first and said second distributing means comprises means for forming the resin-containing material from said source into a stream, a trough intercepting said stream and diverting a portion of the resin-containing material toward said first distributing means and diverting another portion of said resin-containing material toward said second distributing means, and means for tilting said trough toward either of said first and second distributing means.

2. Apparatus according to claim 1 characterized by sensing means sensitive to the thickness of at least one of said first and second layers of resin-containing material for operating said tilting means.

3. Apparatus according to claim 1 characterized further by sensing means for sensing the first layer of resin-containing material on said first sheet, and sensing means for sensing the thickness of the second layer of resin-containing material on said second sheet, both of said sensing means being effective to operate said tilting means.

4. Apparatus according to claim 3 characterized by each of said sensing means comprises two electric eyes located in vertically spaced relationship adjacent each of said distributing means.

5. Apparatus according to claim 3 characterized by each of said sensing means comprising a proximity sensor near each of said distributor means.

6. Apparatus for producing resin-containing material between two sheets, said apparatus comprising a first sheet, a second sheet, means for distributing resin-containing material on said first sheet, means for distributing resin-containing material on said second sheet, means for guiding and moving said sheets in a common direction with the sides having the material thereon facing one another, a single source of resin-containing material, means for delivering the resin-containing material to both of said distributing means from said single source, a trough for changing the proportional amounts of resin-containing material delivered by said delivering means to both of said distributing means, said trough being positioned to receive the resin-containing material from said source and to divide the material into two portions for said distributing means.

7. Apparatus for producing resin-containing material in a flat form of predetermined thickness between two flexible sheets, said apparatus comprising a first generally horizontally-disposed sheet, a second generally horizontally-disposed sheet, means for distributing resin-containing material on an upper surface of said first sheet, means for distributing resin-containing material on an upper surface of said second sheet, means for turning over said second sheet, means for guiding and moving said sheets in a common direction with the surfaces having the material thereon facing one another, a single source of resin-containing material, means for forming the resin-containing material from said source into a stream, distributor means having a trough for intercepting the entire stream, for dividing the stream into two portions and for directing the entire first portion toward said first distributing means and for directing the entire second portion toward said second distributing means, and means for moving said distributor means relative to the stream for changing the relative amounts of the two portions.

8. Apparatus according to claim 7 characterized by said moving means comprises means connected to said distributor means for changing the angle of said distributor means in a vertical plane relative to said stream to change the relative amounts of the two portions of the resin-containing material directed toward said first and said second distributing means.

9. Apparatus according to claim 7 characterized by sensing means for controlling said proportioning means in response to thickness of the resin-containing material on said sheets.

* * * * *